(No Model.)

D. B. SHANTZ.
MANUFACTURE OF BUTTONS FROM VEGETABLE IVORY.

No. 467,563. Patented Jan. 26, 1892.

Witnesses.
Lewis P. Abell.
C. E. Smith

Inventor:
Dilman B Shantz
by Featherstonhaugh & Co
attys

UNITED STATES PATENT OFFICE.

DILMAN B. SHANTZ, OF BERLIN, CANADA.

MANUFACTURE OF BUTTONS FROM VEGETABLE IVORY.

SPECIFICATION forming part of Letters Patent No. 467,563, dated January 26, 1892.

Application filed March 12, 1891. Serial No. 384,805. (No model.)

*To all whom it may concern:*

Be it known that I, DILMAN BRUBACHER SHANTZ, manufacturer, of the town of Berlin, in the county of Waterloo, in the Province of Ontario, Canada, have invented certain new and useful Improvements in the Manufacture of Buttons or Similar Articles from Vegetable Ivory or other Suitable Substances, of which the following is a specification.

The object of the invention is to minimize the amount of labor and material used in the manufacture of buttons, and at the same time secure perfect accuracy in the contact of the finishing-tools, whereby unnecessary waste is avoided; and it consists, essentially, of first preparing the pieces or blanks in such a manner that when inserted in the lathe they will always accurately assume the exact position necessary for their proper finishing, as hereinafter explained.

Figure 1:
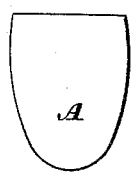
Figure 2:
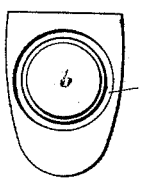
Figure 5:
Figures 3, 4:
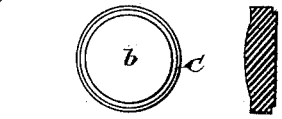
Figure 6:
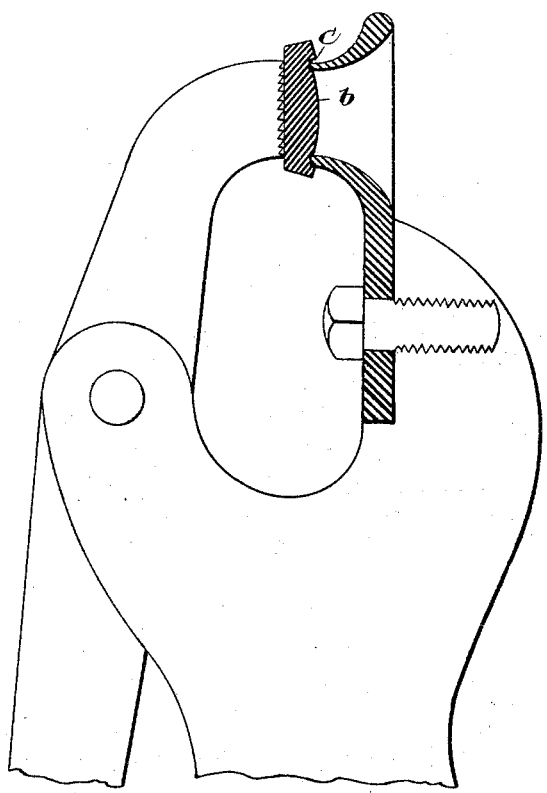

Figure 1 is a rough or unprepared piece of material. Figs. 2 and 4 are prepared pieces of material showing my invention. Figs. 3 and 5 are cross-sections of Figs. 2 and 4, respectively. Fig. 6 is a sectional elevation of the grip or clutch of a button machine or lathe, showing the manner in which the prepared pieces are put into and held in position in the lathe.

In the drawings like letters indicate corresponding parts.

A is an unprepared or rough piece of the material. This piece A is placed in an ordinary button-lathe and by the usual method turned, as shown in Figs. 2 and 4, having the finished or partly-finished surface *b* and the groove C. This surface *b* and groove C may be turned either upon one or both sides of the piece A and may be either circular in form, as shown, or in any other regular shape. Heretofore such buttons or other articles have by one operation been turned from the rough or unprepared piece into a finished article, and in so doing it very frequently happened that the unprepared piece was not properly inserted in the chuck or grip of the lathe, and an imperfect button was the result. The material was consequently useless for any other purpose and became waste. If, however, in the preparation of the piece A, as above described, the groove C should be so cut that there would not be sufficient material to finish a button of the intended size, the piece may be used for a smaller button and all waste avoided. By preparing the piece A as above described, a saving of material is also affected, as the operator can out of a piece of material of equal size turn a larger button than any other method at present in use.

It will be seen that my invention will be of special advantage in the use of automatic machinery, for which purpose it is more particularly intended.

In the practical use of my invention the piece A, having been prepared as above described, may by an unskilled operator or by automatic machinery be placed in the grip or chuck of a lathe, as shown in Fig. 6, the groove C forming a gage or guide for the grip A, and thus insure the accurate placing of the piece in the lathe.

In the manufacture of buttons the blanks are fed very rapidly to the finishing-machine, and hence it has been found in practice that this renders very uncertain the placing of the blanks in the grip or chuck of the lathe, so that small pieces of the material cannot be successfully used, as it is almost impossible in the rapidity of the feeding operation to position small pieces in the chuck so that a completed button can be turned out therefrom, and for this reason it is usual to take larger pieces of material, thus causing a good deal of waste. Further than this, should a piece of the blank material be positioned a little off the center, so that the lathe in turning the button will pass beyond one edge thereof, this would not only spoil the button being made, but the entire piece of material, for the reason that the action of the lathe on the blank will so cut the material that it will not be fit for further use or be capable of further reduction to a button of smaller size. It will be seen, therefore, that my improved process has decided advantages, and the result accomplished by it is a very material one, for the reason that as I first prepare the blank material so that it may be accurately fitted to the chuck of the grip or lathe, I can use very small pieces of stock, which can be fed very rapidly to the finishing-machine, as the feeder has simply to slip it into place, the chuck of the lathe fitting the groove previously formed. Further than this, as I form a simple groove in the pieces of stock, these pieces may be sorted for the purpose of making from them different sizes of buttons—as, for instance, if it is found that a piece is of such size as not to be capable of being made into a certain size of button, it may be put to one side and be used in the machine with a finishing tool for the making of buttons of a smaller size, so there is absolutely no waste. The groove which is made previous to the finishing does not deface the stock and does not prevent it from being made into a button of smaller size.

What I claim as my invention is—

The herein-described method of manufacturing buttons, consisting in first grooving the rough material of which the button is to be made to correspond to the grip of the lathe, applying the material to the lathe, and finally finishing the button, substantially as described.

DILMAN B. SHANTZ.

Witnesses:
SOLOMON BRUBACHER,
IDA SHANTZ.